(12) United States Patent
Ahmed et al.

(10) Patent No.: US 11,283,318 B2
(45) Date of Patent: Mar. 22, 2022

(54) HAIRPIN WINDING ELECTRIC MACHINE

(71) Applicant: FORD GLOBAL TECHNOLOGIES, LLC, Dearborn, MI (US)

(72) Inventors: Adeeb Ahmed, Northville, MI (US); Wei Wu, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 85 days.

(21) Appl. No.: 16/828,192

(22) Filed: Mar. 24, 2020

(65) Prior Publication Data
US 2021/0305864 A1 Sep. 30, 2021

(51) Int. Cl.
H02K 3/14 (2006.01)
H02K 3/48 (2006.01)
H02K 3/28 (2006.01)

(52) U.S. Cl.
CPC ............ *H02K 3/14* (2013.01); *H02K 3/28* (2013.01); *H02K 3/48* (2013.01)

(58) Field of Classification Search
CPC .. H02K 3/00; H02K 3/12; H02K 3/14; H02K 3/16; H02K 3/18; H02K 3/28; H02K 3/30; H02K 3/34; H02K 3/38; H02K 3/48; H02K 3/50
See application file for complete search history.

(56) References Cited

U.S. PATENT DOCUMENTS

| | | | |
|---|---|---|---|
| 6,552,463 B2 | 4/2003 | Oohashi et al. |
| 6,995,492 B1 | 2/2006 | Kouda et al. |
| 7,622,843 B2 | 11/2009 | Cai |
| 7,649,294 B2 | 1/2010 | Koike |
| 8,916,999 B2 | 12/2014 | Imai et al. |
| 9,520,753 B2 | 12/2016 | Rahman et al. |
| 9,531,227 B2 | 12/2016 | Azusawa et al. |
| 9,876,406 B2 | 1/2018 | Han et al. |
| 10,050,484 B2 | 8/2018 | Tamura |
| 10,110,078 B2 | 10/2018 | Neet |
| 10,355,547 B2 | 7/2019 | Hino et al. |
| 10,923,978 B2 | 2/2021 | Shiah et al. |
| 2002/0096963 A1 | 7/2002 | Masegi |
| 2009/0140596 A1 | 6/2009 | Kaiser et al. |
| 2015/0295477 A1 | 10/2015 | Koizumi et al. |

(Continued)

FOREIGN PATENT DOCUMENTS

CN 207265748 U 4/2018

*Primary Examiner* — Tran N Nguyen
(74) *Attorney, Agent, or Firm* — David B Kelley; Brooks Kushman P.C.

(57) ABSTRACT

An electric machine includes a stator core defining slots and a single-layer winding disposed in the core and having first and second parallel paths. Each path includes hairpins interconnected to form a continuous circuit between a terminal and a neutral. The hairpins of the first path include a first type of hairpins each having a first leg, a second leg, a crown connecting between the legs, an outwardly extending twist joined to the first leg, and an inwardly extending twist joined to the second leg, wherein the legs are spaced apart by a span of five slots, and a second type of hairpins each having a first leg, a second leg, a crown connecting between the legs, an inwardly extending twist joined to the first leg, and an outwardly extending twist joined to the second leg, wherein the legs are spaced apart by a span of seven slots.

19 Claims, 10 Drawing Sheets

(56) References Cited

U.S. PATENT DOCUMENTS

| | | |
|---|---|---|
| 2016/0164359 A1 | 6/2016 | Han et al. |
| 2017/0033630 A1* | 2/2017 | Tamura .................... H02K 3/52 |
| 2018/0342918 A1* | 11/2018 | Hino ...................... H02K 3/505 |
| 2019/0044403 A1* | 2/2019 | Kano ....................... H02K 3/38 |
| 2019/0140507 A1 | 5/2019 | Sakuma |
| 2019/0222078 A1 | 7/2019 | Liang et al. |
| 2020/0169137 A1 | 5/2020 | Tang et al. |
| 2020/0169149 A1 | 5/2020 | Liang et al. |
| 2020/0259382 A1 | 8/2020 | Sakuma et al. |
| 2020/0328646 A1 | 10/2020 | Miyawaki |
| 2020/0381969 A1 | 12/2020 | Ahmed et al. |
| 2020/0395804 A1 | 12/2020 | Ahmed et al. |
| 2021/0159743 A1 | 5/2021 | Neet |
| 2021/0305864 A1 | 9/2021 | Ahmed et al. |
| 2021/0305866 A1 | 9/2021 | Ahmed |
| 2021/0313856 A1 | 10/2021 | Ahmed et al. |
| 2021/0328473 A1 | 10/2021 | Kano et al. |

\* cited by examiner

HAIRPIN WINDING ELECTRIC MACHINE

TECHNICAL FIELD

The present disclosure relates to electric machines and more specifically to electric machines that include hairpin windings.

BACKGROUND

Vehicles such as fully electric vehicles and hybrid-electric vehicles contain a traction-battery assembly to act as an energy source for the vehicle. The traction battery may include components and systems to assist in managing vehicle performance and operations. The traction battery may also include high-voltage components, and an air or liquid thermal-management system to control the temperature of the battery. The traction battery is electrically connected to an electric machine that provides torque to driven wheels. Electric machines typically include a stator and a rotor that cooperate to convert electrical energy into mechanical motion or vice versa.

SUMMARY

According to one embodiment, an electric machine includes a stator core defining slots and a single-layer winding disposed in the core and having first and second parallel paths. Each path includes hairpins interconnected to form a continuous circuit between a terminal and a neutral. The hairpins of the first path include a first type of hairpins (first hairpins) each having a first leg, a second leg, a crown connecting between the legs, an outwardly extending twist joined to the first leg, and an inwardly extending twist joined to the second leg, wherein the legs are spaced apart by a span of five slots, and a second type of hairpins (second hairpins) each having a first leg, a second leg, a crown connecting between the legs, an inwardly extending twist joined to the first leg, and an outwardly extending twist joined to the second leg, wherein the legs are spaced apart by a span of seven slots.

According to another embodiment, an electric machine includes a stator core defining slots having a plurality of radial positions, and a plurality of hairpins each having legs disposed in corresponding ones of the slots and twists extending from the legs. The hairpins are inserted into the stator core with corresponding ones of the twists connected to form a three-phase winding. For each of the radial positions, the twists extend from their respective legs in a same circumferential direction of the stator core.

According to yet another embodiment, an electric machine includes a stator core defining slots and a winding disposed in the core and having at least two parallel paths including hairpins interconnected to form at least two continuous circuits between a terminal and a neutral. The hairpins of each path include a first type of hairpins (first hairpins) each having first and second legs spaced apart by a span of five slots, and a second type of hairpins (second hairpins) each having first and second legs spaced apart by a span of seven slots.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
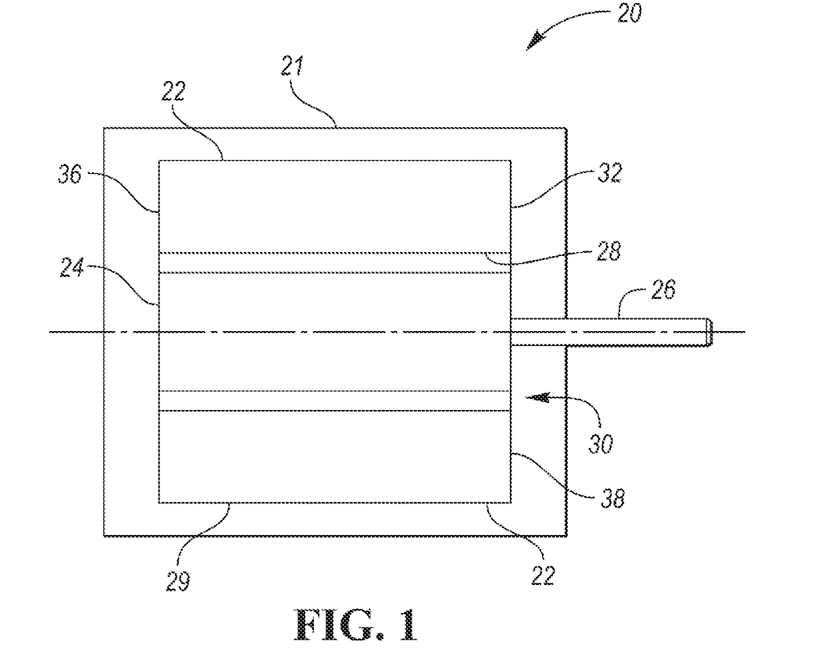
FIG. 1 is a schematic diagram of an electric machine.

Referring to FIG. 1, a hairpin electric machine 20 may be used in a vehicle such as a fully electric vehicle or a hybrid-electric vehicle. The electric machine 20 may be referred to as an electric motor, a traction motor, a generator, or the like. The electric machine 20 may be a permanent magnet machine, an induction machine, or the like. In the illustrated embodiment, the electric machine 20 is a three-phase alternating current (AC) machine. The electric machine 20 is capable of acting as both a motor to propel the vehicle and as a generator such as during regenerative braking.

The electric machine 20 may be powered by a traction battery of the vehicle. The traction battery may provide a high-voltage direct current (DC) output from one or more battery-cell arrays, sometimes referred to as battery-cell stacks, within the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

The traction battery may be electrically connected to one or more power electronics modules. The power electronics modules may be electrically connected to the electric machines 20 and may provide the ability to bi-directionally transfer electrical energy between the traction battery and the electric machine 20. For example, a typical traction battery may provide a DC voltage while the electric machine 20 may require a three-phase (AC) voltage. The power electronics module may include an inverter that converts the DC voltage to a three-phase AC voltage as required by the electric machine 20. In a regenerative mode, the power electronics module may convert the three-phase AC voltage from the electric machine 20 acting as a generator to the DC voltage required by the traction battery.

Figure 2:
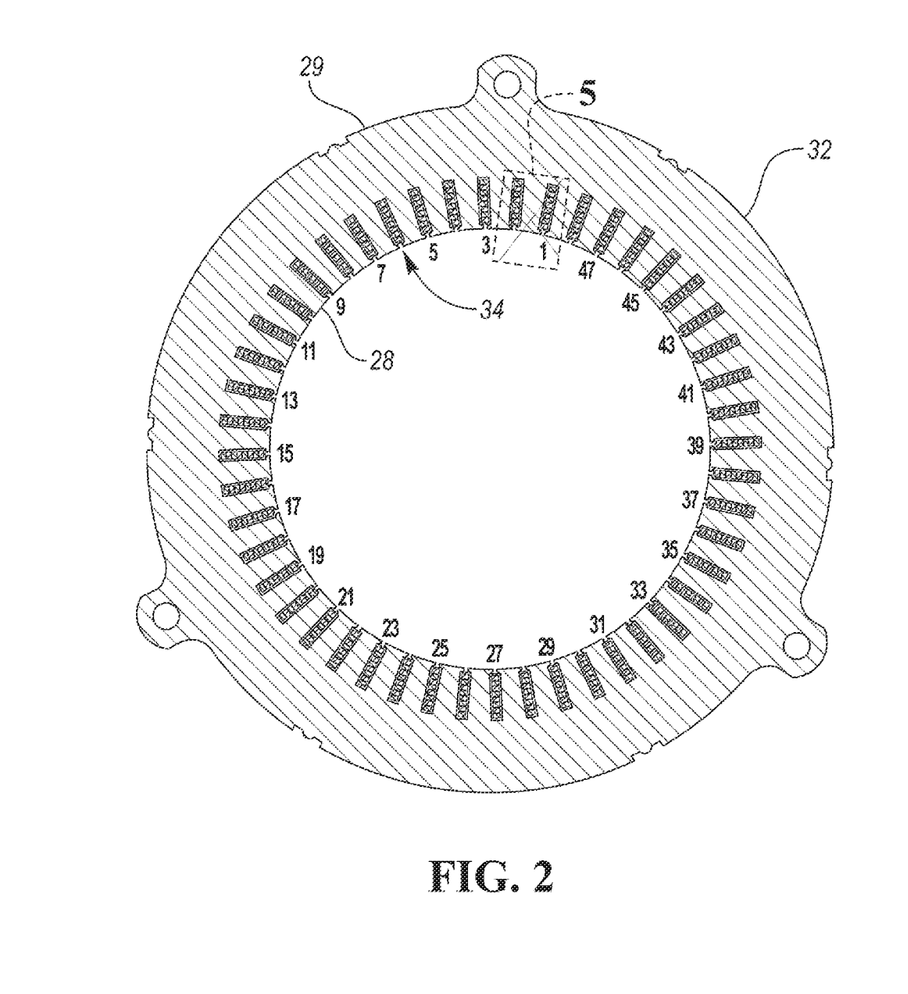
FIG. 2 is a cross-sectional end view of a stator of the electric machine.

Referring to FIGS. 1 and 2, the electric machine 20 includes a housing 21 that encloses the stator 22 and the rotor 24. The stator 22 is fixed to the housing 21 and includes a cylindrical core 32 having an inner diameter 28 that defines a hole 30 and an outer diameter 29. The core 32 may be formed from a plurality of stacked laminations. The rotor 24 is supported for rotation within the hole 30. The rotor 24 may include windings or permanent magnets that interact with windings of the stator 22 to generate rotation of the rotor 24 when the electric machine 20 is energized. The rotor 24 may be supported on a driveshaft 26 that extends through the housing 21. The driveshaft 26 is configured to couple with a drivetrain of the vehicle.

The stator core 32 defines slots 34 circumferentially arranged around the core 32 and extending outward from the inner diameter 28. The slots 34 may be equally spaced around the circumference and extend axially from a first end 36 of the core 32 to a second end 38. In the illustrated embodiment, the core 32 defines forty-eight slots and has eight poles, but the core 32 may include more or fewer slots and/or poles in other embodiments. For example, the core 32 may define seventy-two slots and have 12 poles. According to one embodiment, each slot is 30 electrical degrees. The electric machine 20 may be a double-layer machine meaning that some of the slots contain more than one phase. In the illustrated embodiment, half of the slots contain two phases and the other half of the slots include a single phase. This is in contrast to a single-layer machine where each slot only contains a single phase.

The slots 34 are spaced by a circumferential distance measured between the center lines of two adjacent slots. This distance can be used as a unit of distance (hereinafter "a slot") for relating and measuring other components of the stator 22. The distance unit "slot" is sometimes referred to as "slot pitch" or "slot span."

Figure 3:
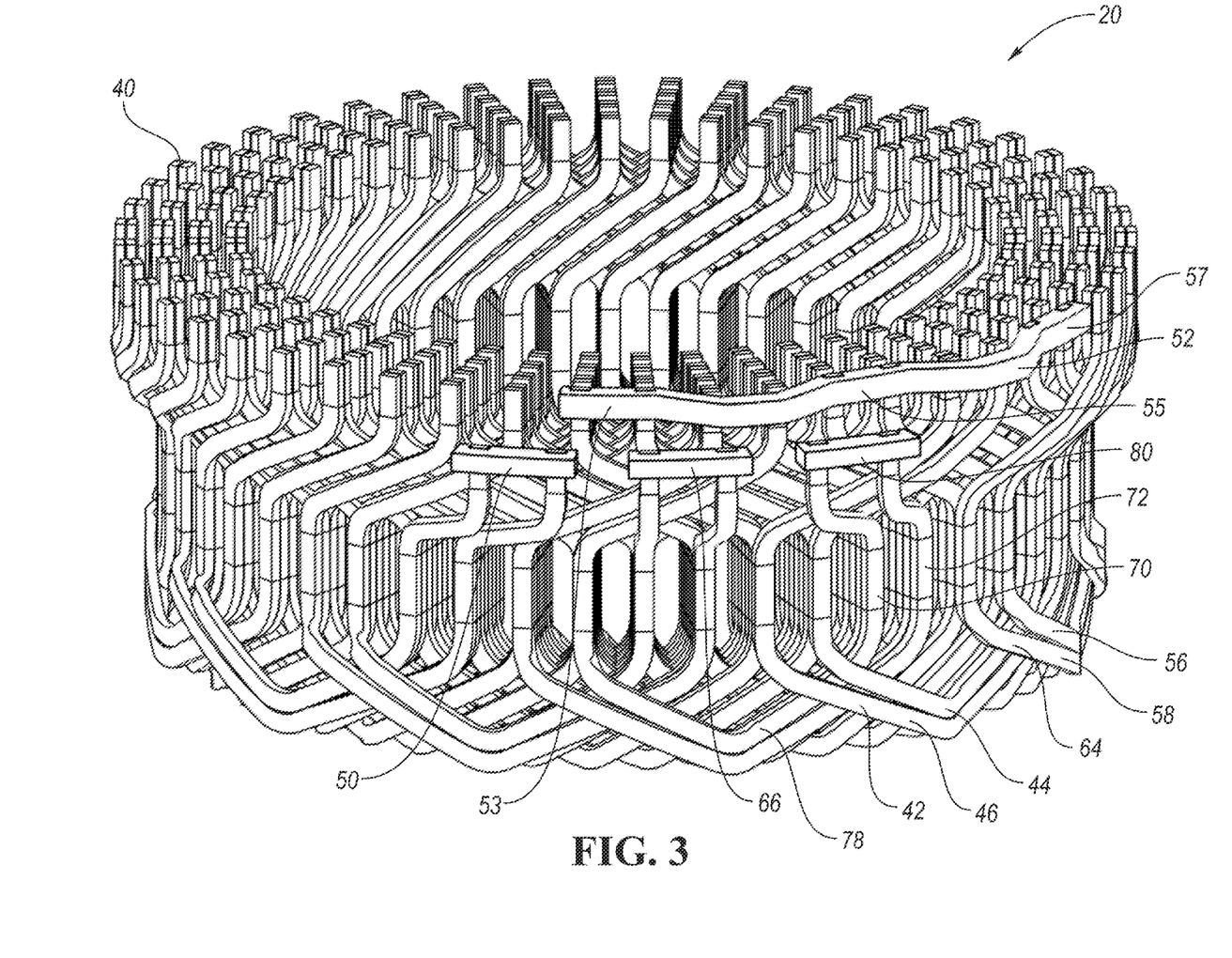
FIG. 3 is a diagrammatical perspective view of a winding of the electric machine with legs of the hairpins substantially shortened for illustrative purposes.

Referring to FIGS. 2 and 3, the electric machine 20 may include hairpin windings 40 placed in the slots 34 of the core 32. Hairpin windings are an emerging technology that improves efficiency for electric machines used in vehicles and other applications. The hairpin windings 40 improve efficiency by providing a greater amount of stator conductors to reduce resistance of the winding 40 without encroaching into space reserved for the electrical steel and the magnetic flux path.

One challenge with a hairpin winding is matching the electric-machine design to the desired torque-speed curve. An essential step in designing an electric machine is selecting the phase turn number so that the torque-speed curve covers all required operating points. For conventional stranded windings made of long wires connected in parallel, the desired phase turn number is selected by choosing the number of turns per coil, the number of parallel paths, the number of poles, the number of slots per pole, and the number of layers. While all these factors are also available for hairpin windings, the limiting factors are very different resulting in fewer feasible choices.

For example, while the possible number of poles, slots per pole, and layers are identical between the two technologies, it is not practical in a hairpin winding to have as many turns per coil as in a stranded winding. Each hairpin needs to be connected to the next hairpin by welding, soldering or the like, and needs to be bent according to a specific shape in order to make the connection possible. This limits the number and size of the conductors that can be fit in a single slot. Another challenge is creating parallel circuits that are balanced and have reasonably complex connections. Two paths are balanced if their flux linkage is the same and the voltage is the same.

The electric machine 20 solves these and other problems without requiring jumpers. A jumper is a conductor used to connect hairpins that are adjacent in the electrical path but are not physically adjacent making a direct connect infeasible. A jumper does not extend through the slots and instead extends around the end face or the core. The electric machine 20 may be a three-phase machine in which the hairpin windings 40 are arranged in a U phase, a V phase, and a W phase. Each phase includes associated hairpins conductors (also known as pins, hairpins, or bar conductors) arranged in two or more parallel paths of windings. In the illustrated embodiment, each phase includes two parallel paths. Each phase may include more or less parallel paths in other embodiments.

The hairpins are generally U-shaped with each bent to include a pair of legs joined by a crown. The hairpins are installed in the stator core 32 by inserting the legs through corresponding ones of the slots 34. All of the hairpins may be installed from the same end of the stator core 32, e.g., end 36, so that all of the crowns are located on one end of the stator, e.g., end 36, and the ends of the legs are located on the other end, e.g., end 38. Once installed, the legs of the hairpins are bent to form twists that connect with the twists of other hairpins. The ends of corresponding twists are joined by a connection such as a weld 48. End 36 may be referred to as the crown end and end 38 may be referred to as the weld end (or twist end). The hairpins are typically made of bar conductors having a rectangular cross-section, but the hairpins may have a circular or other cross-sectional shape.

The U phase may include a first path 44 and a second path 46. The paths 44, 46 are balanced and in parallel. Each path may be equally disposed in the even and odd slots, e.g., path 44 has 24 legs in even slots and 24 legs in odd slots. The paths are formed by a plurality of interconnected pins 42, that once connected, form a continuous circuit. Each of the paths includes a first end that starts at the U-phase terminal 50 and a second end that ends to a neutral connection. In the illustrated embodiment, the electric machine 20 includes a single neutral bar 52, but multiple neutral bars may be used in other embodiments. The first and second paths 44, 46 connect to the neutral connection 52 near 53. The paths 44, 46 are connected to each other at the terminal 50, which is located near the outer diameter (OD) 29 of the stator core. The first and second paths 44, 46 start near the OD 29 of the stator core 32 and have terminal leads 59 (which are essentially extra-long twists) to connect to the terminal 50. The first and second paths 44, 46 may wind (advance), in a zig-zag fashion, in the counterclockwise direction (when looking at end 38) through the slots 34 and end near the OD 29 at the neutral connection 52. (Other embodiments are contemplated, see FIG. 11 for example.) The first and second paths 44, 46 have five and seven pitch crown geometry at radially outermost and innermost position and all six-pitch crown at all intermediate locations. The selection of five and seven pitch crown geometry are chosen to ensure identical electromagnetic slot occupancy between two paths without creating any physical hindrance in the crown and twist side geometry. The first and second paths 44, 46 may be zig-zagged resulting in the paths only encircling the stator core once. However, this may not be the case in other embodiments. This is in contrast to most hairpin motors in which multiple stator revolutions are required to traverse from the ID to the OD. In the illustrated embodiment, each of the paths includes twenty-four pins that are interconnected end-to-end to form a continuous conductor between the terminal 50 and the neutral connection 52 without the need of jumpers.

The V phase may include a first path 56 and a second path 58. The paths 56, 58 are balanced and in parallel. The paths are formed by a plurality of interconnected pins 64. Each of the paths includes a first end that starts at the V-phase terminal 66 and a second end that ends at the neutral connection 52 near 55. (In other embodiment, the U and V phases may have separate neutral bars.) The paths 56, 58 are connected to each other at the terminal 66, which is located near the OD 29 of the stator core. The first and second paths 56, 58 start near the OD 29 of the stator core and have terminal leads 67 to connect to the terminal 66. The first and second paths 56, 58 have five and seven pitch crown geometry at radially outermost and innermost position and all six-pitch crown at all intermediate locations. The selection of five and seven pitch crown geometry are chosen to ensure identical electromagnetic slot occupancy between two paths without creating any physical hindrance in the crown and twist side geometry. The first and second paths 56, 58 may wind, in a zig-zag fashion, in the counterclockwise direction through the slots 34 and end near the OD 29 at the neutral connection 52. The first and second paths 56, 58 may wind around the stator core only one time, like the U-phase. In the illustrated embodiment, each of the paths 56, 58 includes twenty-four pins that are interconnected end-to-end to form a continuous conductor between the terminal 66 and the neutral connection 52.

The W phase may include a first path 70 and a second path 72. The paths 70, 72 are balanced and in parallel. The paths are formed by a plurality of interconnected pins 78. Each of the paths includes a first end that starts at the W-phase terminal 80 and a second end that ends at the neutral connection 52 or the like. The paths 70, 72 are connected to each other at the terminal 80, which is located near the OD 29 of the stator core. In other embodiments, the U, V, or W phase terminals may be located near the ID 28. The first and second paths 70, 72 start near the OD 29 of the stator core and have terminal leads to connect to the terminal 80. The first and second paths 70, 72 wind in the counterclockwise direction through the slots 34 and end near the OD 29 at the neutral connection 52 near 57. Thus, all of the paths of all of the phase advance in the same direction. The first and second paths 70, 72 have five and seven pitch crown geometry at radially outermost and innermost position and all six-pitch crown at all intermediate locations. The selection of five and seven pitch crown geometry are chosen to ensure identical electromagnetic slot occupancy between two paths without creating any physical hindrance in the crown and twist side geometry. The first and second paths 70, 72 may wind around the stator core, in a zig-zag fashion, only one time. In the illustrated embodiment, each of the paths includes twenty-four pins that are interconnected end-to-end to form a continuous conductor between the terminal 80 and the neutral connection 52. The terminals 50, 66, and 80 may include additional leads to connect to the inverter and receive voltage from the inverter, which creates torque-producing current in the winding paths causing the rotor 24 to rotate within the stator 22.

The hairpins of each of the paths may include one or more types of hairpins. Different types of hairpins may differ in shape and/or size. The hairpins of machine 20 may include two main types: hairpins with both twists extending inward (e.g., FIG. 4A, 4B) and pins with one twist extending outward and one twist extending inward (e.g., FIGS. 4C and 4D).

Figure 4A:
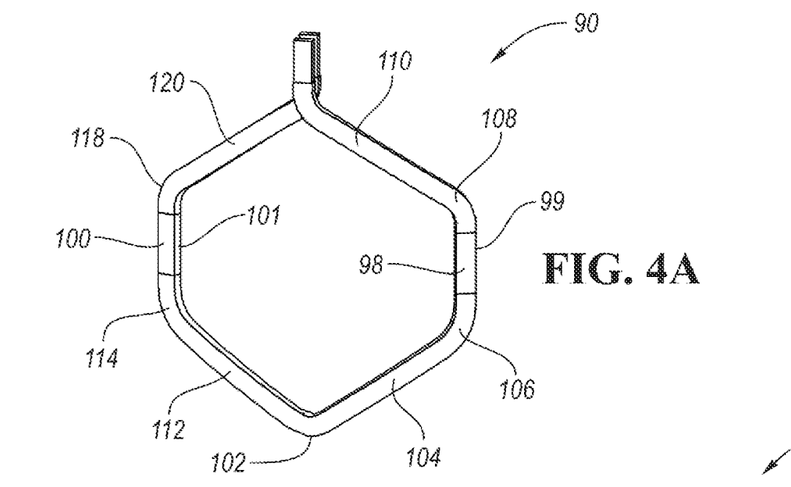
FIG. 4A is a perspective view of a first type of hairpin.

Referring to FIG. 4A, an example interior pin 90 may include a first leg 98 joined to a second leg 100 at a vertex 102. (The pins are not to scale and the legs are shortened for illustrative purposes.) The vertex 102 may radially offset the legs to place the legs in different slot positions. The vertex 102 may be formed by a twist that radially offsets the legs by the dimension of one pin in the radial direction. The pins 90 may be formed from a single piece of metal such as copper, aluminum, silver, or any other electrically conductive material. The first leg 98 is disposed in one of the slots 34 and the second leg 100 is disposed in another of the slots 34 that is spaced apart by a span of slots. The pins 90 may have a span equal to the number of slots per pole, which is six slots in the illustrated embodiment. Thus, if the first leg 98 was in Slot 1, the second leg 100 would be in Slot 7. The leg 98 includes a straight portion 99 disposed within a slot 34 and a first angled portion 104 that extends between the vertex 102 and the straight portion 99. The straight portion 99 and the angled portion 104 are joined at a first bend 106. The leg 98 also includes a twist 110 that is angled inward at a second bend 108. The second leg 100 includes a straight portion 101 disposed within a slot 34 and a first angled portion 112 that extends between the vertex 102 and the straight portion 101. The first and second angled portions 104, 112 and the vertex 102 maybe collectively referred to as a crown. The straight portion 101 and the angled portion 112 are joined at a first bend 114. The second leg 100 also includes a twist 120 that is angled inward at a second bend 118. The twists 110, 120 angle towards each other enabling the winding to zig-zag. The twist 110 and the twist 120 may have the same lengths of three slots. Since the both twist 110, 120 fold back over the pin 90, rather than extending away like most hairpins, the pins 90 have a relative short overall span of 6 slots. The pin 90 may be fabricated by first forming the vertex 102, the first angled portions 104, 112, and two extended straight portions. Then, the pin 90 is installed into the stator 22 by inserting the extended straight portions into the slots 34 of the stator 22. The second bends 108, 118 and the twists 110, 120 are formed after the pin 90 is installed through the slots by bending the extended legs as desired. The pins 90 may be used in radial positions 2 and 3 as will be described below.

Figure 4B:
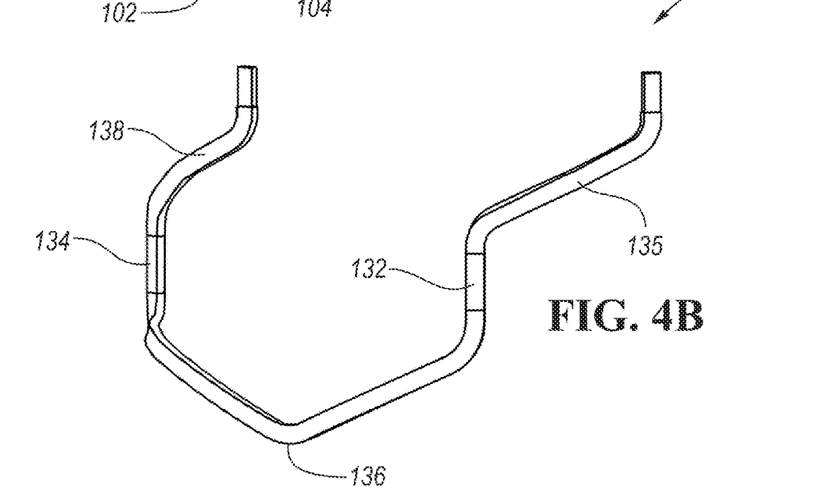
FIG. 4B is a perspective view of a second type of hairpin.

Referring to FIG. 4B, an example first exterior hairpin 94 may include a first leg 132 joined to a second leg 134 at a vertex 135. (This pin may be called a connector or a joinder pin depending upon its placement in the winding.) The vertex 135 may be bent so that each of the legs are in a same slot position. The pins 94 may be formed from a single piece of metal such as copper, aluminum, silver, or any other electrically conductive material. The first leg 132 is disposed in one of the slots 34 and the second leg 134 is disposed in another of the slots 34 that is spaced apart by a span of slots. The pins 94 has a span of seven slots in the illustrated embodiment. The leg 132 includes a twist 136 that is angled inward, and the first leg 134 includes a twist 138 that is angled outward. That is, the twists 136, 138 extend in the same direction. The twist 136, 138 may have the same span, e.g., three slots. The pins 94 may have an overall span of 10 slot. The pins 94 may be used nearest the OD 29 or the nearest the ID 28 depending upon which path it is part of.

Figure 4C:
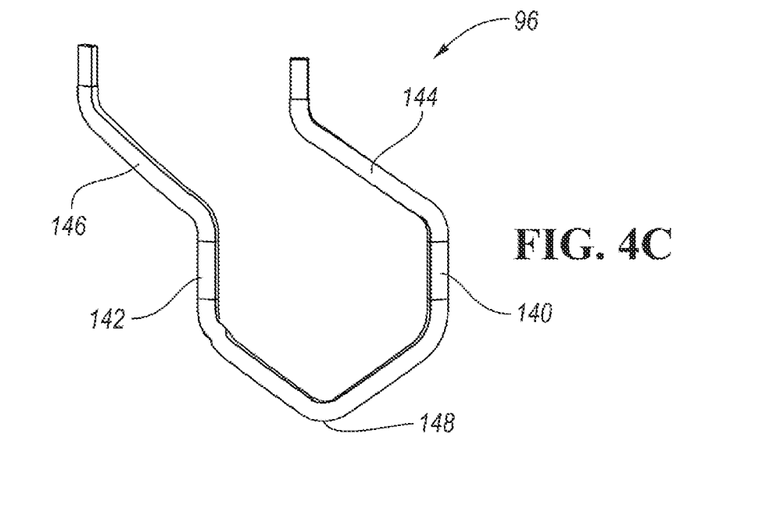
FIG. 4C is a perspective view of a third type of hairpin.

Referring to FIG. 4c, an example second exterior pin 96 may include a first leg 140 joined to a second leg 142 at a vertex 148. (This pin may be called a connector or a joiner pin depending upon its placement in the winding.) The vertex 148 may be bent so that each of the legs are in a same slot position. The pins 94 may be formed from a single piece of metal such as copper, aluminum, silver, or any other electrically conductive material. The first leg 140 is disposed in one of the slots 34 and the second leg 142 is disposed in another of the slots 34 that is spaced apart by a span of slots. The pins 94 may has a span five slots in the illustrated embodiment. The leg 140 includes a twist 144 that is angled inward, and the second leg 142 includes a twist 146 that is angled outward. That is, the twists 144, 146 extend in the same direction. The twist 144, 146 may have the same span, e.g., three slots. The pins 96 may have an overall span of eight slots. The pins 96 may be used nearest the OD 29 or the nearest the ID 28 depending upon which path it is part of.

Figure 5:
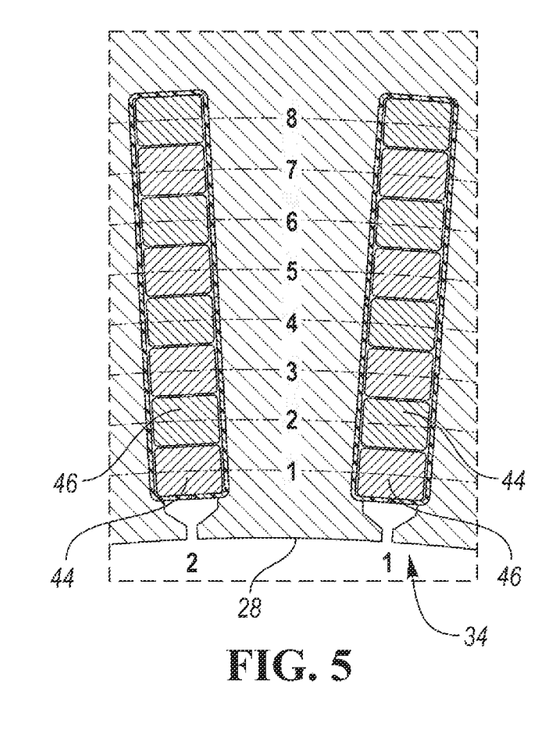
FIG. 5 is a magnified view of portion of FIG. 2.

Referring to FIGS. 2 and 5, the slots 34 are numbered 1 through 48 in the counterclockwise direction with the odd number slots being labeled for convenience. The slots 34 may include positions in the radial direction, which may be referred to as radial slot positions, radial positions, slot positions, or positions. Each position represents a pin-receiving area that receives one leg of a hairpin. In the illustrated embodiment, each slot 34 has eight sequential positions in a one-by-eight linear arrangement, however, other arrangements are contemplated. Thus, in the illustrated embodiment, each slot 34 includes eight legs, one in each slot position. The positions are labeled 1 through 8, with the first position being nearest the ID and the eighth position being nearest the OD. Positions 1 and 8 may be referred to as exterior positions and positions 2-7 may be referred to as interior positions. The term "radial slot position" is used to describe both a single position of a single slot and to refer to the collective positions at that radial location of the stator core 32. (The slot positions are sometimes referred to as radial layers as the slot positions are aligned and collectively form concentric rings around the stator core. It is important to note that these radial layers refer to something different than the above-described single and double-layer winding arrangements, which refer to the number of phases in each slot.) In one or more embodiments, the hairpins 90 are located in the interior slot positions and the hairpins 94, 96 are located in positions 1 and 8.

Referring to FIG. 5, the illustrated winding 40 is a single-layer winding, i.e., each slot only contains one of the phases. The paths may alternate within the slots. For example, the slot 1 starts with the second path 46 in position 1, the first path 44 in position 2, the second path 46 in position 3, etc., and slot 2 is the opposite of slot 1.

Figure 6:
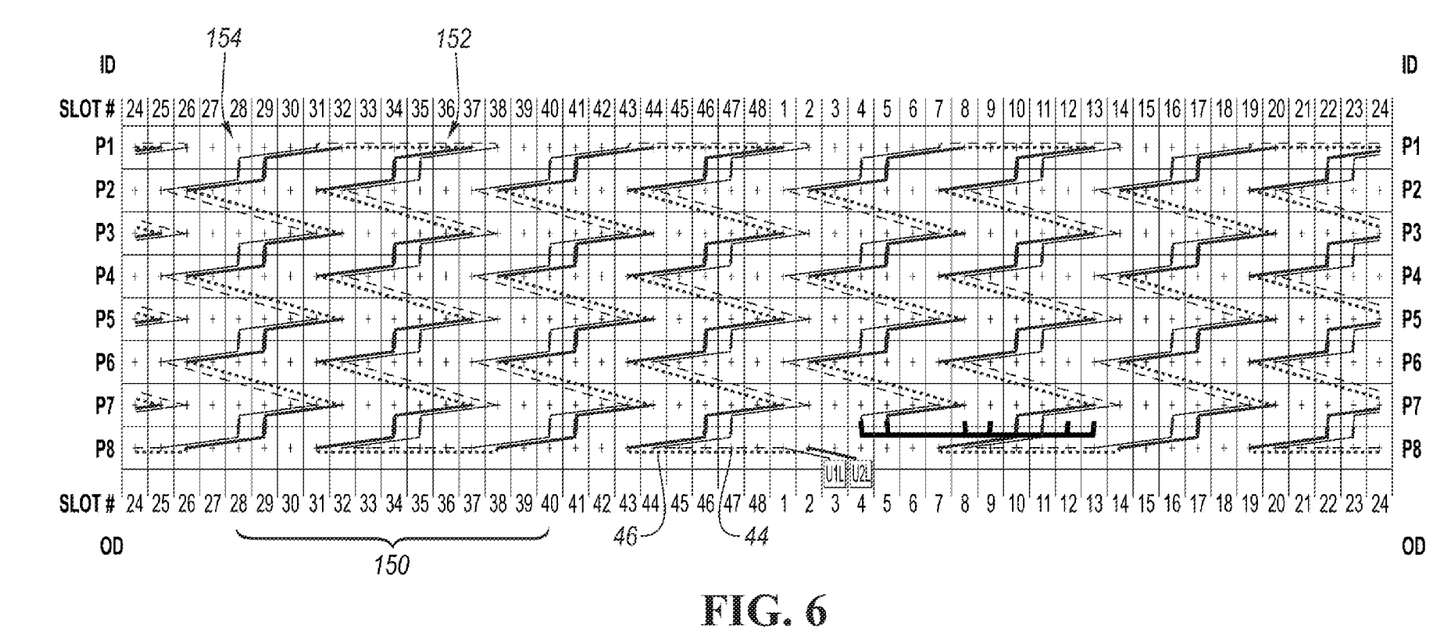
FIG. 6 is a winding diagram of a U phase of the windings looking from a weld side (also known as a twist side) of the stator.

Referring to FIG. 6, a winding diagram of the U phase is shown. In the machine 20, the paths may be wound in a repeating pattern of blocks 150. Each of the blocks may be the same, albeit shifted circumferential to different slots. In a 48-slot stator, the windings include four blocks each containing 12 consecutive slots. In this description, the blocks 150 will be delineated at position 8, however, this is arbitrary. Each block 150 begins at the trailing end of the first hairpin and terminates at the leading end of the last hairpin. The terms "leading" and "trailing" refer to the position of the component relative to the direction of advancement through the path with the terminal being considered the start and the neutral being the end. Each block may include eight hairpins: one hairpin 96, which is the first hairpin in path 44, one hairpin 94, which is the fifth hairpin in path 44, and six hairpins 90, one of which is the last hairpin of the block 150. Unique to this arrangement is that each path 44, 46 of windings traverses from the OD to the ID and back to the OD within each block 150, e.g., within a span of 12 slots. Most winding arrangements are wound circumferentially and require one or more revolutions of the stator to traverse from the OD to the ID and back. This winding arrangement employees a zig-zag route to achieve a large amount of radial displacement is a short amount of circumferential advancement. The zig-zag is created mostly by the interior pins 90, which have both twists extending inwardly. Each block 150 may include a pair of sub-blocks 152, 154. A sub-block refers to a collection of hairpins that traverse in one radial direction, i.e., from the OD to the ID (sub-block 152) or form the ID to the OD (sub-block 154). In the first path 44, the hairpins 94 interconnect the sub-blocks 152 and 154 and the hairpins 96 are used to interconnect adjacent blocks 150. In the illustrated embodiment, the intermediate hairpins 90 of each path are disposed in the same slots within the sub-blocks, e.g., the hairpins 90 of path 44 of sub-block 152 are in slots 32 and 38.

Figure 7:
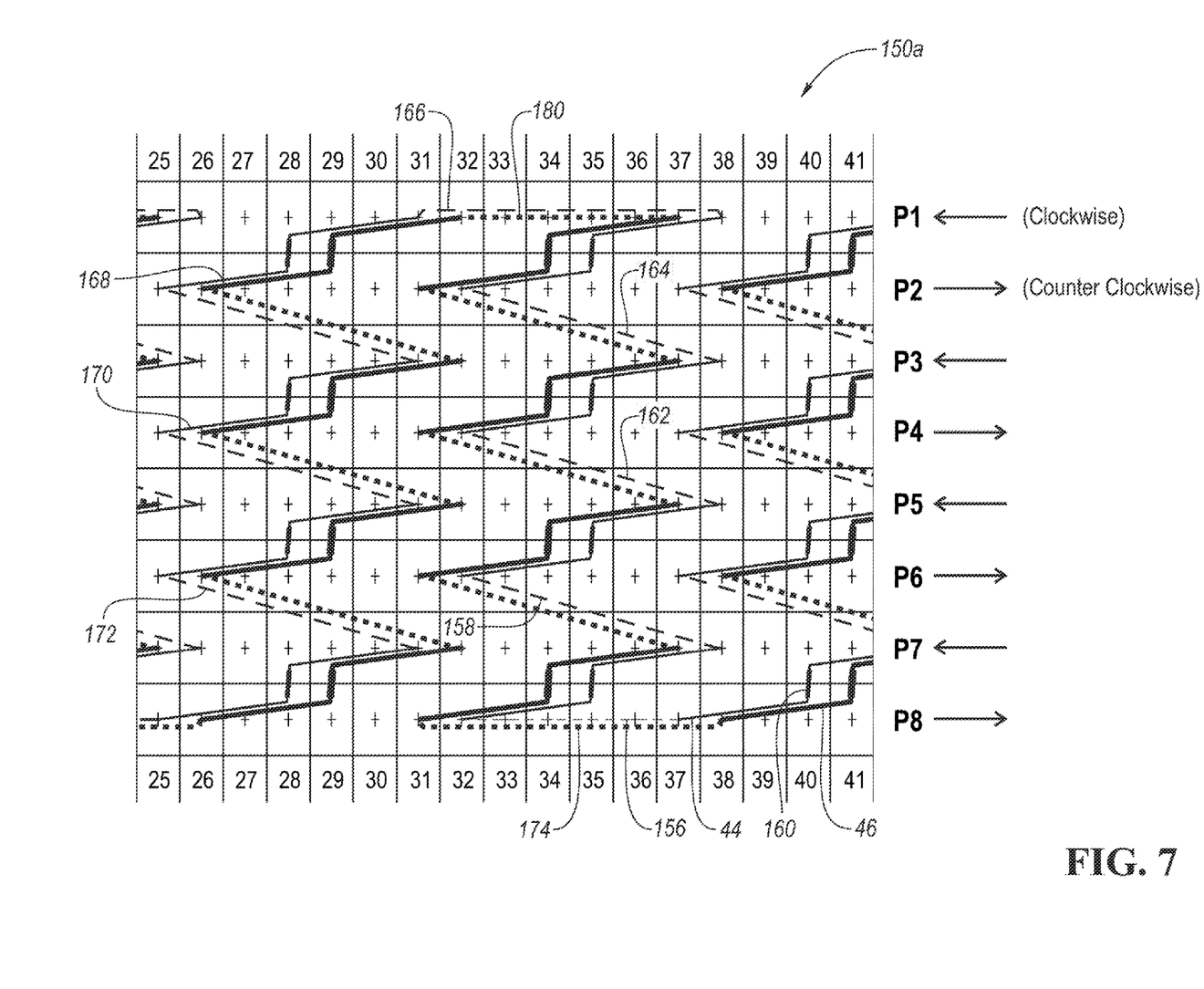
FIG. 7 is a detail view of the U-phase winding diagram showing of a block of the U phase.
Figure 8:
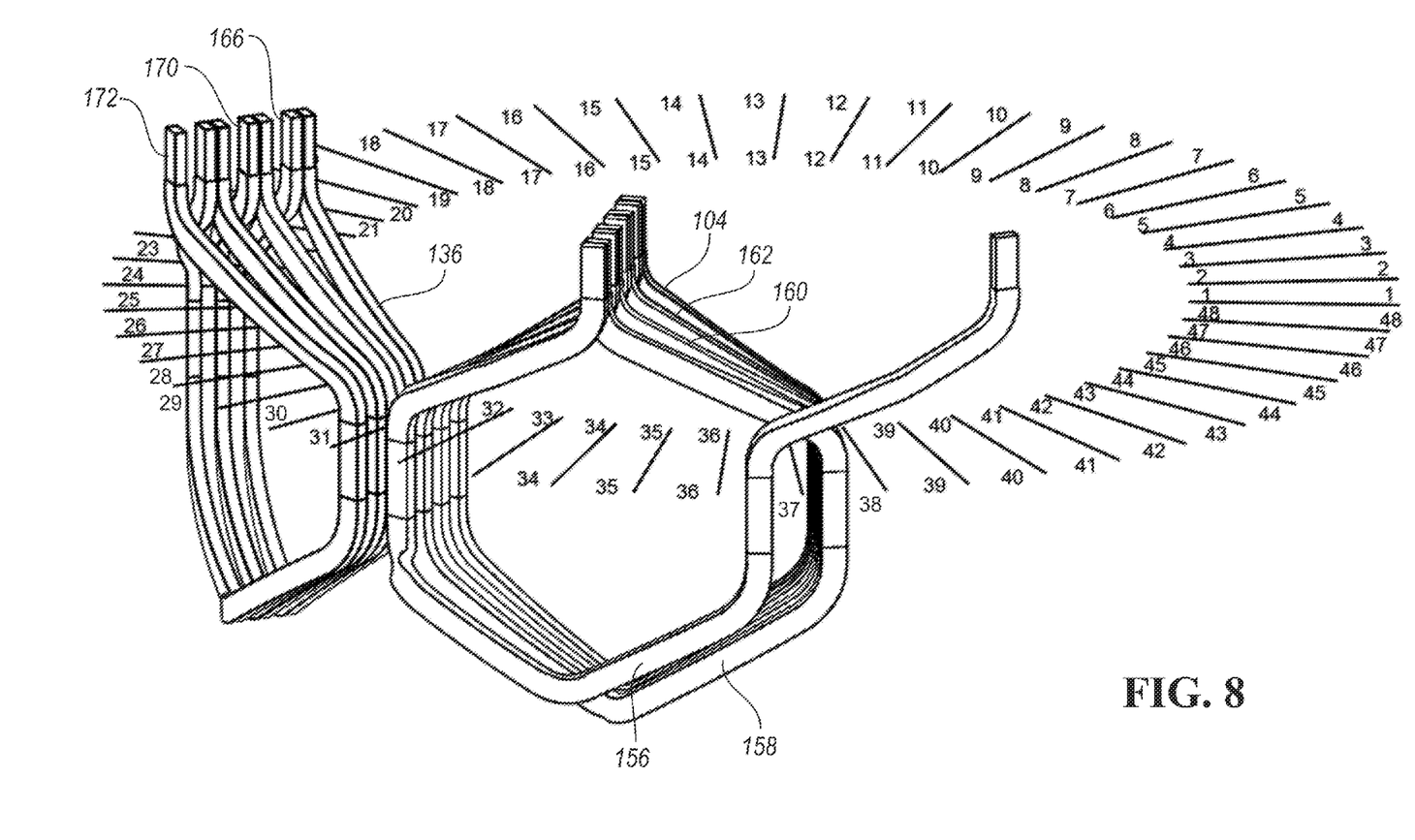
FIG. 8 is a perspective view of the windings for the block shown in FIG. 7.

Referring to FIGS. 7 and 8, the first block 150a of the first path 44 begins at slot 40 with the first hairpin 156, which is an exterior pin 96. An end of the twist 146 is located above slot 40 and is joined by a weld 160 to the last hairpin of the fourth block, which is a hairpin 90. The trailing leg 142 of the hairpin 156 is disposed in slot 37 and the leading leg 140 is disposed in slot 32. Both legs are disposed in the eighth position. The crown of the hairpin 156 advances the path 44 forward 5 slots. The twist 144 of the leading leg 140 then retards the path 44 back 3 slots. The twist 128 of the second hairpin 158 further retards the path by 3 more slots to place the trailing leg 122 in the seventh position of slot 38 and the leading leg 124 in the sixth position of slot 32. The twist 128 is joined to the first hairpin 156 by a weld 160. The crown 126 of the hairpin 158 advances the path 44 forward six slots and the twist 130 then retards the path 44 back 3 slots. Two additional hairpins (type 90) 162, 164 are connected in series and placed similar to hairpin 158 except in different layers as shown in the drawings.

The fifth pin 166, which is a joinder pin and of the type 94, is connected between the fourth pin 164 (last pin of sub-block 152) and the sixth pin 168 (first pin of sub-block 154). The trailing twist 138 is connected to the fourth hairpin 164 and retards the path 44 by 3 slots whereas the leading twist 136 advances the path 44 by 3 slots. The fourth pin 164 has the largest span between the legs at seven slots. The trailing leg 134 of the pin 166 is disposed in the first position of slot 38 and the leading leg 132 is disposed in the first position of slot 31. The leading twist 136 advances forward by 3 slots to connect to the sixth pin 168. The sixth pin 168, which is an interior pin 90, includes a trailing leg 100 disposed in the second position of slot 25 and a leading leg 98 disposed in the third position of slot 31. In contrast to the sub-block 152, the hairpins of the sub-block 154 are advanced by the twists and are retarded by the crowns. The seventh pin 170, which is an interior pin 90, includes a trailing leg 124 disposed in the fourth position of slot 25 and a leading leg 122 disposed in the fifth position of slot 31. The trailing twist 130 of the seventh pin 170 is joined to the leading twist 110 of the sixth pin 168. The leading twist 128 is connected to next interior pin, eight pin 172. The eighth pin 172 has a trailing leg disposed in sixth position of slot 25 and a leading leg disposed in the seventh position of slot 31. The leading twist 128 is connected to the connector pin of the next block 150. This pattern repeats itself around the stator core 32.

Referring to FIG. 7, the first block 150a of the second path 46 begins at slot 41 with the first hairpin 174, which is an exterior pin 94. An end of the twist 136 is located above slot 41 and is welded to the last hairpin of the fourth block. The trailing leg 134 of the hairpin 174 is disposed in slot 38 and a leading leg 134 is disposed in slot 31. Both legs are disposed in the eighth position. The fifth pin 180, which is a joinder pin and of the type 96. The trailing leg 140 of the pin 180 is disposed in the first position of slot 37 and the leading leg 142 is disposed in the first position of slot 32. The fifth pin 180 has the smallest span between the legs at five slots. The second path further includes intermediate pins 90 that are installed within the block 150 similar to path 1 albeit in different slots.

Referring back to FIG. 6, in the illustrated embodiment, the twists in each radial position extend from their respective leg in a same circumferential direction and have a same slot span. For example, hairpins that have legs in the first position have associated twists that extend clockwise; hairpins that have legs in the second position have associated twists that extend counterclockwise; hairpins that have legs in the third position have associated twists that extend clockwise, etc. This in combination with the other above-described features places the to-be-connected twists adjacent to each other so that they can be directly joined without the need for any jumpers. This may be true for the other phases as well.

Figure 9:
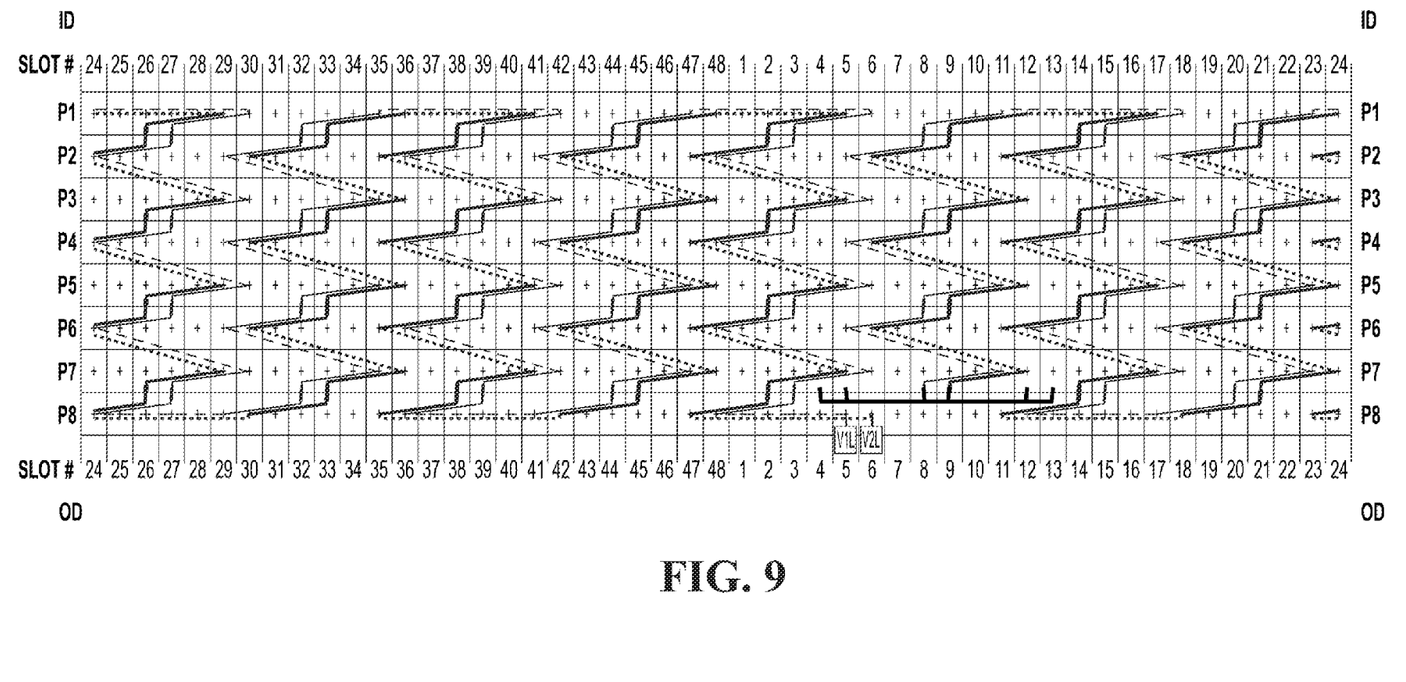
FIG. 9 is a winding diagram of a V phase of the windings looking from the weld side of the stator.
Figure 10:
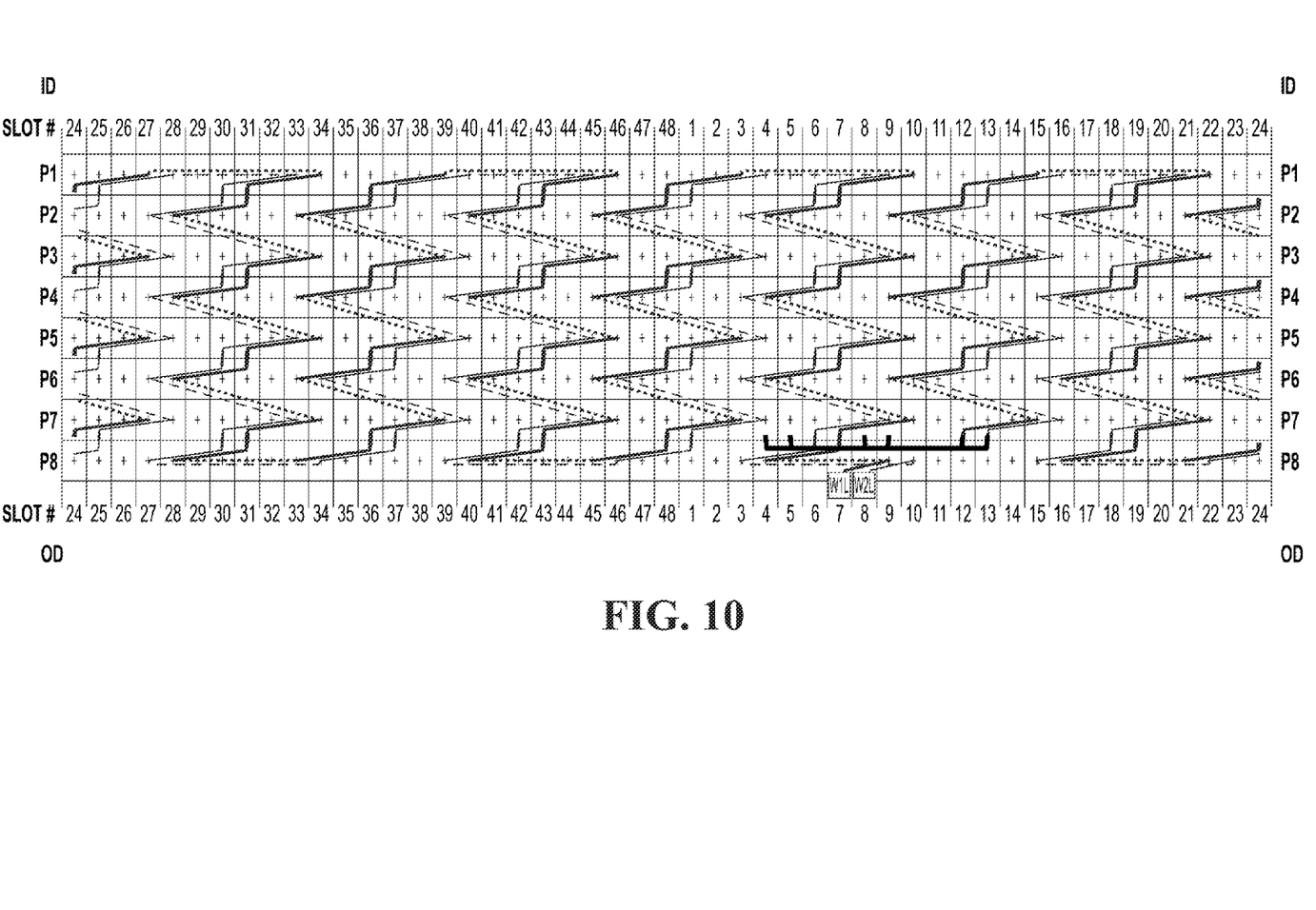
FIG. 10 is a winding diagram of a W phase of the windings looking from the weld side of the stator.

Referring to FIGS. 9 and 10, the V and W phases of the windings 40 may be the same as the U phase but shifted to different slots. The V phase may be shifted over four slots in the counterclockwise direction to have the first pin of path 56 disposed in slot 5 and 48 and to have the first pin of path 58 disposed in slots 6 and 47. The W phase may be shifted over eight slots from the U phase in the counterclockwise direction to have the first pin of path 70 disposed in slot 9 and 4 and to have the first pin of path 72 disposed in slots 10 and 3. Please see the winding diagrams for the remain hairpin locations.

Figure 11:
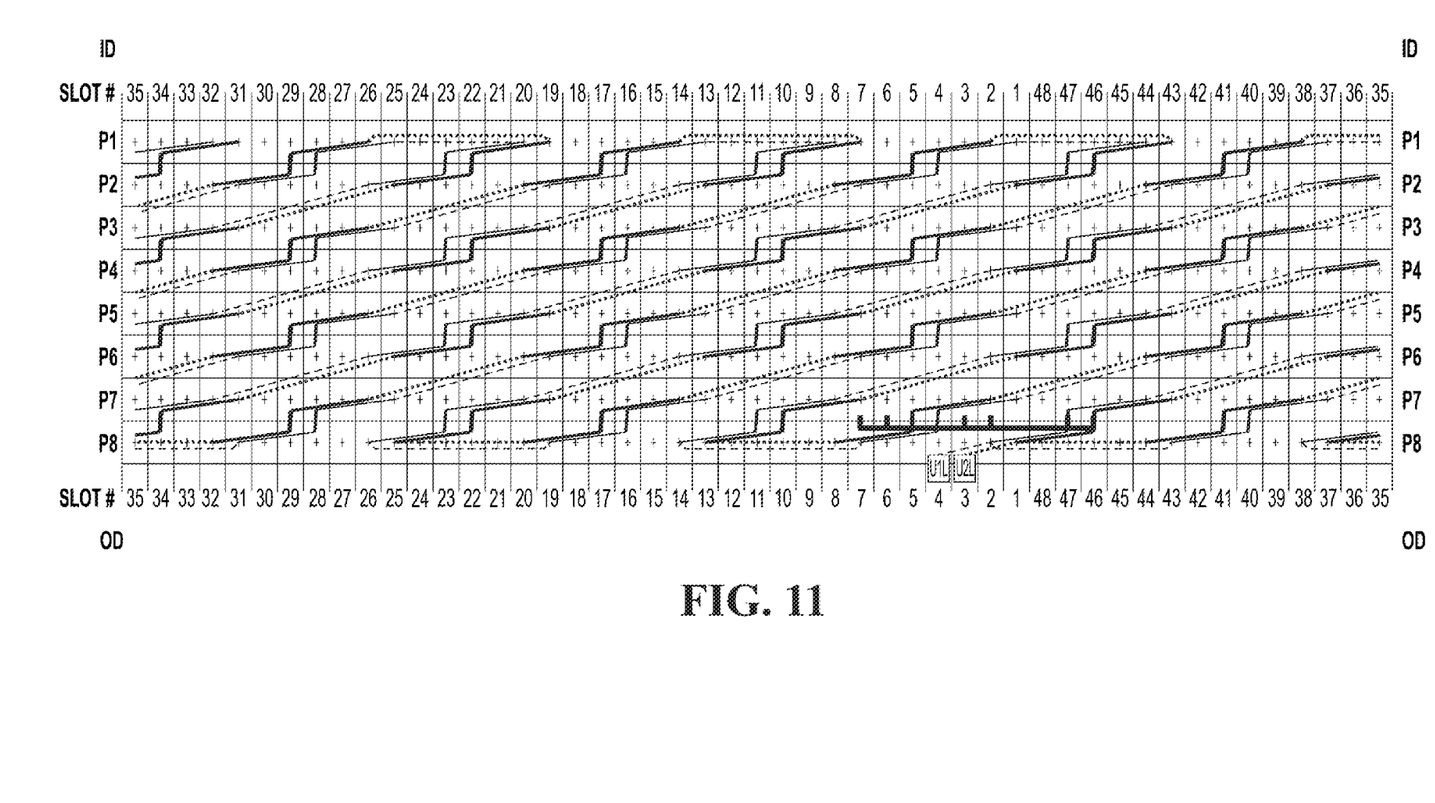
FIG. 11 is a winding diagram of the U phase according to an alternative embodiment.

This disclosure is not limited to the above-described winding arrangements and contemplates any winding having ID and OD hairpins with slot spans of five and seven, respectfully or vice versa. FIG. 11 illustrates an alternative winding having ID and OD hairpins with slot spans of five and seven, respectfully or vice versa. This embodiment includes the above-described hairpins 94 and 96, but the interior hairpins are modified to have both twists extend outwardly from the legs. The interior hairpins may have a span of six slots and the twist may have a span of three slots.

Referring to FIG. 11, the winding 200 may have a U phase, a V phase, and a W phase as described above (only the U phase is shown). The winding 200 is shown as single phase. The U phase includes first and second parallel paths 202, 204 like above. The legs of the winding 200 may be arranged in the same slots and radial position as the winding 40. In the illustrated embodiments, the twist side of the windings 40 and 200 are the same, but the crown sides are different. The direction of winding advance is also different. The windings 200 advance counterclockwise from the terminals 206 towards the neutral 208.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
   a stator core defining slots; and
   a single-layer winding disposed in the core and having first and second parallel paths each including hairpins interconnected to form a continuous circuit between a terminal and a neutral, wherein the hairpins of the first path include:
   a first type of hairpins (first hairpins) each having a first leg, a second leg, a crown connecting between the legs, an outwardly extending twist joined to the first leg, and an inwardly extending twist joined to the second leg, wherein the legs are spaced apart by a span of five slots, and
   a second type of hairpins (second hairpins) each having a first leg, a second leg, a crown connecting between the legs, an inwardly extending twist joined to the first leg, and an outwardly extending twist joined to the second leg, wherein the legs are spaced apart by a span of seven slots.

2. The electric machine of claim 1, wherein the hairpins of the first path further include a third type of hairpins (third hairpins) each having first and second legs spaced apart by a span of six slots.

3. The electric machine of claim 2, wherein each of the third hairpins further includes a first inwardly extending twist joined to the first leg and a second inwardly extending twist joined to the second leg.

4. The electric machine of claim 1, wherein the slots have a plurality of radial positions, and wherein the legs of the first hairpins are disposed in a first of the positions, and the legs of the second hairpins are disposed in a second of the positions.

5. The electric machine of claim 4, wherein the first radial position is nearest an outer diameter of the stator core, and the second radial position is nearest an inner diameter of the stator core.

6. The electric machine of claim 1, wherein the slots have a plurality of radial positions including an inner-most position, an outer-most position, and intermediate positions therebetween, and wherein, both of the legs of the first hairpins are disposed in the outer-most positions and both of the legs of the second hairpins are disposed in the inner-most positions, and wherein the hairpins of the first path further include a third type of hairpins (third hairpins) each having first and second legs spaced apart by a span of six slots and disposed in the intermediate positions.

7. The electric machine of claim 6, wherein, for each of the third hairpins, the first and second legs are disposed in different ones of the intermediate positions.

8. The electric machine of claim 1, wherein the hairpins of the second path also include the first hairpins and the second hairpins.

9. The electric machine of claim 8, wherein the slots have a plurality of radial positions including an inner-most position and an outer-most position, wherein the legs of the first hairpins of the first path and the legs of the second hairpins of the second path are disposed in the inner-most position, and the legs of the second hairpins of the first path and the legs of the first hairpins of the second path are disposed in the outer-most position.

10. The electric machine of claim 1, wherein, for each of the first hairpins, the inwardly and outwardly extending twists have a same slot span, and, for each of the second hairpins, the inwardly and outwardly extending twists have a same slot span.

11. The electric machine of claim 10, wherein the twists of the first hairpins have a same slot span as the twists of the second hairpins.

12. An electric machine comprising:
a stator core defining slots having a plurality of radial positions; and
a plurality of hairpins each having legs disposed in corresponding ones of the slots and twists extending from the legs, wherein the hairpins are inserted into the stator core with corresponding ones of the twists connected to form
a three-phase winding having end turns, wherein each of the end turns configured with a single-bent portion that define a vertex, wherein, for each of the radial positions, all of the twists of that radial position extend from their respective legs in a same circumferential direction of the stator core.

13. The electric machine of claim 12, wherein the twists disposed in adjacent ones of the radial positions extend from their respective legs in opposite circumferential directions of the stator core.

14. The electric machine of claim 12, wherein the plurality of radial positions includes eight positions, wherein the twists of even ones of the positions extend from their respective legs in a first circumferential direction of the stator core, and the twists of odd ones of the positions extend from their respective legs in a second circumferential direction of the stator core that is opposite the first.

15. The electric machine of claim 12, wherein each phase of the three-phase winding includes at least two parallel paths that each extend between a terminal and a neutral.

16. An electric machine comprising:
a stator core defining slots; and
a winding disposed in the core and having at least two parallel paths including hairpins interconnected to form at least two continuous circuits between a terminal and a neutral, wherein the hairpins of each path include:
a first type of hairpins (first hairpins) each having first and second legs spaced apart by a span of five slots, and each further having an outwardly extending twist joined to the first leg and an inwardly extending twist joined to the second leg, and
a second type of hairpins (second hairpins) each having first and second legs spaced apart by a span of seven slots.

17. The electric machine of claim 16, wherein each of the second hairpins further has an outwardly extending twist joined to the first leg and an inwardly extending twist joined to the second leg.

18. The electric machine of claim 16, wherein the slots have a plurality of radial positions, and wherein the legs of the first hairpins are disposed in a first one of the positions, and the legs of the second hairpins are disposed in a second one of the positions.

19. The electric machine of claim 16, wherein the hairpins of each path further includes a third type of hairpins (third hairpins) each having first and second legs spaced apart by a span of six slots.

* * * * *